United States Patent [19]
Bray et al.

[11] Patent Number: 5,885,465
[45] Date of Patent: Mar. 23, 1999

[54] METHOD OF SEPARATING SHORT HALF-LIFE RADIONUCLIDES FROM A MIXTURE OF RADIONUCLIDES

[75] Inventors: Lane A. Bray, Richland; Jack L. Ryan, West Richland, both of Wash.

[73] Assignee: Battelle Memorial Institute, Richland, Wash.

[21] Appl. No.: 5,728

[22] Filed: Jan. 13, 1998

Related U.S. Application Data

[62] Division of Ser. No. 766,684, Dec. 13, 1996, Pat. No. 5,809,394.

[51] Int. Cl.$^6$ ...................................................... C02F 1/42
[52] U.S. Cl. .............................. 210/681; 423/6; 423/251; 423/253; 376/189
[58] Field of Search ................................... 423/3, 6, 251, 423/253; 376/158, 170, 189; 424/1.47; 210/681

[56] References Cited

U.S. PATENT DOCUMENTS

| | | | |
|---|---|---|---|
| 3,459,634 | 8/1969 | Ruiz et al. . | |
| 3,884,718 | 5/1975 | Deaton et al. . | |
| 4,276,267 | 6/1981 | Bentley et al. | 423/2 |
| 4,663,129 | 5/1987 | Atcher et al. | 423/2 |
| 5,246,691 | 9/1993 | Geerlings et al. | 424/1.1 |
| 5,355,394 | 10/1994 | Van Geel et al. | 376/189 |
| 5,457,323 | 10/1995 | Geerlings | 250/432 PD |
| 5,512,256 | 4/1996 | Bray et al. | 423/2 |

OTHER PUBLICATIONS

H.W. Kirby, Residue Adsorption—III Mutual Separation of 227 Ac, 227Th and 223 Ra, J. Inorg. Nucl. Chem. 1969, vol. 31, pp. 3375–3387, 1969.

W.F. Davidson, et al, The Gamma–Ray Spectrum of 227Th, Nuclear Physics, pp. 342–362, 1968.

*Primary Examiner*—Ngoclan Mai
*Attorney, Agent, or Firm*—Paul W. Zimmerman

[57] ABSTRACT

The present invention is a method of removing an impurity of plutonium, lead or a combination thereof from a mixture of radionuclides that contains the impurity and at least one parent radionuclide. The method has the steps of (a) insuring that the mixture is a hydrochloric acid mixture; (b) oxidizing the acidic mixture and specifically oxidizing the impurity to its highest oxidation state; and (c) passing the oxidized mixture through a chloride form anion exchange column whereupon the oxidized impurity absorbs to the chloride form anion exchange column and the $22^9$Th or $2^{27}$Ac "cow" radionuclide passes through the chloride form anion exchange column. The plutonium is removed for the purpose of obtaining other alpha emitting radionuclides in a highly purified form suitable for medical therapy. In addition to plutonium; lead, iron, cobalt, copper, uranium, and other metallic cations that form chloride anionic complexes that may be present in the mixture; are removed from the mixture on the chloride form anion exchange column.

18 Claims, 8 Drawing Sheets

500

METHOD OF SEPARATING SHORT HALF-LIFE RADIONUCLIDES FROM A MIXTURE OF RADIONUCLIDES

This patent application is a divisional application of Ser. No. 08/766,684, filed Dec. 13, 1996, now U.S. Pat. No. 5,809,394.

This invention was made with Government support under Contract DE-AC06-76RL0 1830 awarded by the U.S. Department of Energy. The Government has certain rights in the invention.

FIELD OF THE INVENTION

The present invention relates generally to a method for separating short half-life radionuclides from a mixture of radionuclides. The method includes purifying a solution of radionuclides or more specifically to a method for removing plutonium, lead, and other unwanted cations, or a combination thereof from a solution or mixture of radionuclides. As used herein, the term solution is a subset of the term mixture in accordance with standard definitions.

BACKGROUND OF THE INVENTION

The widespread recognition of the use of radiation to kill or neutralize unwanted cell growth such as cancer has led to increasing interest in various species of radionuclides. Of particular interest are radionuclides which emit alpha radiation, or alpha emitters, because the alpha radiation emitted by these radionuclides does not penetrate deeply into tissue. Thus, by placing alpha emitters adjacent to unwanted cell growth, such as a tumor, the tumor may be exposed to the alpha radiation without undue exposure of surrounding healthy tissue. In many such schemes, the alpha emitter is placed adjacent to the tumor site by binding the alpha emitter to a chelator which is in turn bound to a monoclonal antibody which will seek out the tumor site within the body. Unfortunately, in many instances, the chelator will also bind to metals other than the desired alpha emitter. Since a tumor may have a limited number of sites available for binding with the monoclonal antibody, it is desirable that the number of monoclonal antibodies bonded to metals other than the desired alpha emitter be minimized.

The radioactive decay chains are well known: $^{233}$U (1.62× $10^5$ yr $t_{1/2}$) $^{229}$Th (7,340 yr $t_{1/2}$)→$^{225}$Ra (14.8 day $t_{1/2}$)→$^{225}$Ac (10 day $t_{1/2}$)→$^{213}$Bi 47 min $t_{1/2}$); and $^{235}$U (7.13×10$^8$ yr $t_{1/2}$)→$^{231}$Th (25.6 hr $t_{1/2}$)→$^{231}$Pa (3.43×10$^4$ yr $t_{1/2}$)→$^{227}$Ac (22 yr $t_{1/2}$)→$^{227}$Th (18.6 day $t_{1/2}$)→$^{223}$Ra (11.1 day $t_{1/2}$). Three alpha emitters particularly well suited for use in medical applications due to their short half lives are Radium-223 ($^{223}$Ra); and Actinium-225 and Bismuth-213 ($^{225}$Ra→$^{225}$Ac→$^{213}$Bi). Typically, $^{223}$Ra is derived as a daughter product of Thorium-227 which is in turn a daughter product of Actinium-227, ($^{227}$Ac) (Ac "cow"). $^{227}$Ac is normally produced by reactor irradiation of $^{226}$Ra. It is not currently being produced in the U.S. and most of that in existence as well as most of the available $^{226}$Ra exists as wastes or residues from other processes or studies, and, as such, is typically found in a mixture with a wide variety of degraded organic materials and other cations, including Pu, Fe, Co, Cu, and U. As used herein, the terms cation, ion, and metal ion are used interchangeably.

Similarly, $^{225}$Ra/Ac and $^{213}$Bi are daughter products of Thorium-229 ($^{229}$Th) (Th "cow") which is in turn a daughter product of Uranium-233 ($^{233}$U).

Because of the relatively long half-life of $^{229}$Th and the limited decay time of existing stocks of $^{233}$U metal, U$_3$O$_8$, and UO$_2$, other ions including Pu, Fe, Co, Cu, Pb, etc. generally greatly exceed the $^{229}$Th content on a molar basis. Previously recovered $^{229}$Th contains these and various other impurities including degraded organic materials.

To purify any of these radionuclides from a mixture containing one or more impurities to render the radionuclide in a form suitable for use in medical applications requires that the radionuclides be separated from the impurities. Impurities include but are not limited to any degraded organic compounds and/or cations for example Pu, Fe, Co, Cu, and U. Thus, there exists a need for a method to separate radionuclides from a mixture containing a variety of impurities, especially plutonium for utility in medical therapy.

SUMMARY OF THE INVENTION

The present invention is a method of removing an impurity of plutonium, lead, other unwanted cations, or combination thereof, from a mixture of radionuclides that contains the impurity and at least one parent radionuclide. The method has the steps of (a) insuring that the mixture is a hydrochloric acid mixture;

(b) oxidizing the acidic mixture and specifically oxidizing the impurity to its highest oxidation state; and (c) passing the oxidized mixture through a chloride form anion exchange column whereupon the oxidized impurity adheres to the chloride form anion exchange column and the parent radionuclide passes through the chloride form anion exchange column.

Insuring that the mixture is hydrochloric acid may be as simple as confirming that the mixture has a hydrochloric acid carrier or solvent. If, however, the mixture has another carrier or solvent, for example, nitric acid, then the non-hydrochloric acid carrier or solvent must be replaced with the hydrochloric acid carrier or solvent. Carrier replacement has the steps of:

(a) drying the mixture to remove a non-hydrochloric acid solvent; and (b) adding hydrochloric acid as a carrier.

The impurity, plutonium, lead or combination thereof, is removed for the purpose of obtaining alpha emitting radionuclides in a purified form suitable for medical therapy. In addition to the specific impurity, other cations that may be present in the mixture are removed from the mixture on the chloride form anion exchange column.

Of particular relevance to the present invention is the separation of radionuclides such as $^{227}$Ac and/or $^{229}$Th from plutonium. Such radionuclides may then be used as "cows" to grow the alpha emitting radionuclides, $^{223}$Ra and $^{225}$Ra/Ac products respectively, in a purified form.

A further step of separating the alpha-emitting product from the "cow" is necessary for medical therapy. Product separation is accomplished by step of passing the parent radionuclide through a nitrate form anion exchange column that produces an effluent product and an eluent "cow".

A further aspect of the present invention is that once a purified "cow" is obtained, it is passed through two ion exchange columns the first of which permits separating the "cow" from at least one daughter product. The second ion exchange column separates the daughter product from the product. The daughter product is recycled back to the "cow" "cow" thereby decreasing the time to sufficient product for the next "milking".

Accordingly, it is an object of the present invention to provide a method for removing Pu from a solution containing alpha emitting radionuclides.

It is a further object of the invention to provide a method for generating alpha emitting radionuclides in a pure form.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
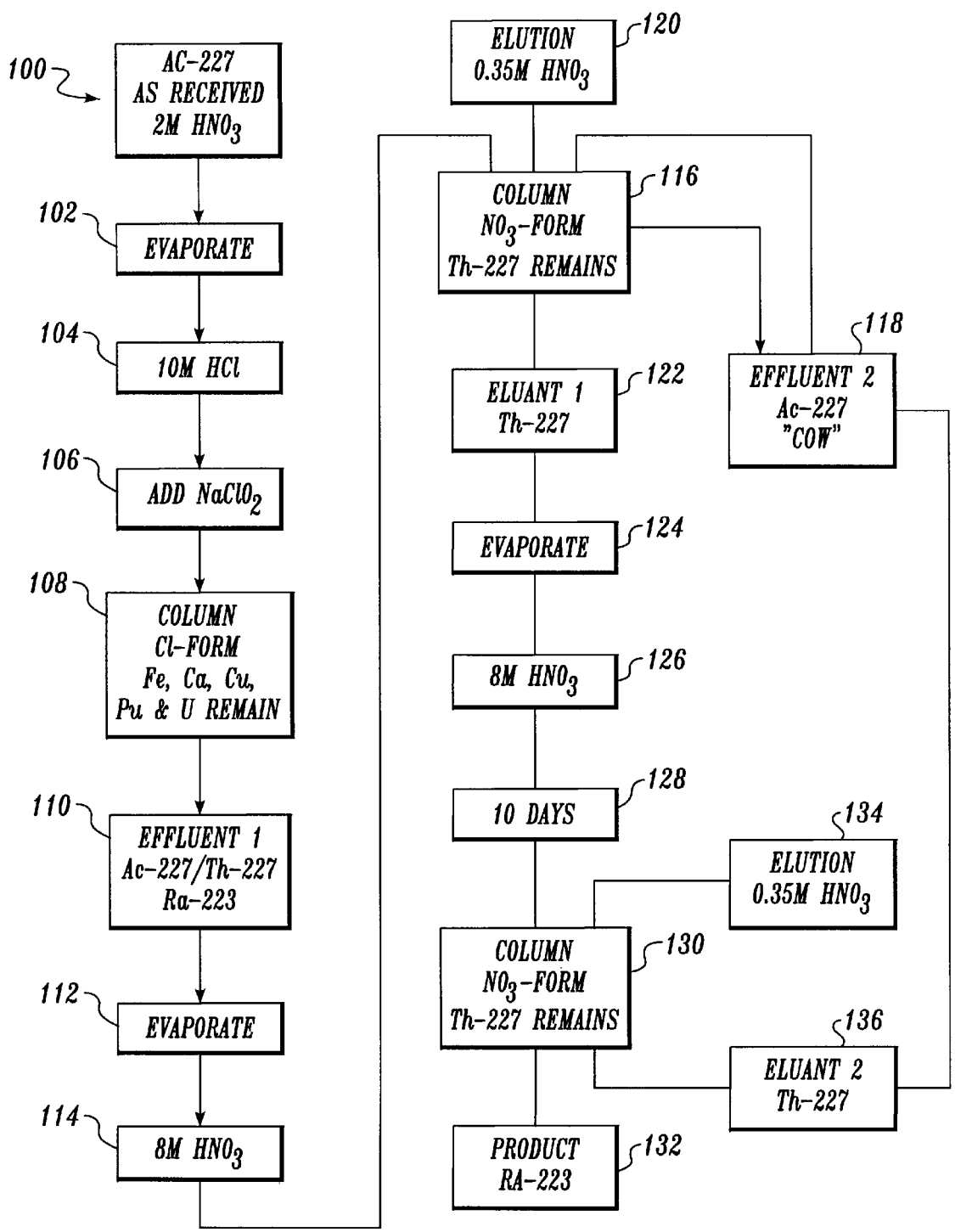
FIG. 1 is a process flow diagram for obtaining $^{223}$Ra from impure $^{227}$Ac.

As is practiced by the present invention, the preparation of the alpha emitting radionuclides from a mixture containing the parent radionuclides or "cow" of the alpha emitting radionuclides together with impurities is accomplished in a two step process. In the first step, Pu along with other undesirable cation impurities including, but not limited to Fe, Co, Cu, and U, are separated from the cow by selectively adhering the Pu and other ions to a chloride form anion exchange column. To be compatible with the chloride form anion exchange column, the mixture must be hydrochloric acid. If the mixture is not hydrochloric acid, the mixture containing the cow and the impurities is converted to a hydrochloric acid form. Conversion generally involves evaporating the non-hydrochloric acid carrier and adding the hydrochloric acid carrier followed by evaporating the hydrochloric acid carrier and adding more hydrochloric acid carrier to insure removal of all of the non-hydrochloric acid carrier. Evaporation is preferably accomplished by heating, for example with a heat lamp or a stirring hot plate.

In general, several impurity metal ions will adhere to the chloride form anion exchange column (based on published chloride anion data) while the "cow" ($^{227}$Ac or $^{229}$Th) will pass through. Metal ion impurities found in these solutions often include Pu in a +3 or +4 valence state [Pu(III or IV)]. Like other metal ions that form anionic chloride complexes, Pu(IV) will adhere to the anion exchange column. However, disproportionation of Pu(IV) generates Pu(III) which will not adhere to the chloride form anion exchange column but will instead pass through the chloride form anion exchange column along with the cow, thereby maintaining impurity of the cow. It is also recognized that Pu in a +6 valence state, [Pu(VI)], will adhere to the chloride form anion exchange column even more strongly than does Pu(IV). Thus, to insure maximum absorption of the Pu to the anion exchange column, the mixture is first oxidized to raise the Pu to its highest oxidation state (+6). Preferably the oxidation is accomplished with a chemical oxidant. More preferably the chemical oxidant is sodium chlorite (NaClO$_2$) because it decomposes to NaCl which is a major component of the body fluids. Other strong oxidants may be used to provide the desired oxidation, but other oxidizing agents may contain other readily complexable metals which would result in having to remove such metals to attain the goal of purifying the sample. By oxidation, Pu(IV) is converted to Pu(VI). By first oxidizing the solution, the amount of Pu(IV) present is greatly reduced. Even if not all Pu(IV) is oxidized to Pu(VI), its ability to disproportionate producing Pu(III) is greatly diminished by the large amount of Pu(VI). Thus oxidized, the maximum amount of Pu is adsorbed onto the chloride-form anion exchange column as either Pu(IV) or Pu(VI) and a minimum amount of Pu disproportionates to Pu(III) which passes through the anion exchange column. If lead is present in the form of Pb(II), it will also be oxidized to Pb(IV) which is adsorbed onto the chloride form anion exchange column. In addition to the Pu, and/or lead (Pb), other impurity metal ions that form anionic chloride complexes absorb to the chloride form anion exchange column and are thereby removed from the solution leaving a clean "cow". Other impurity metal ions include but are not limited to Cu, Fe and Zn.

Depending upon the nature of impurities, for example presence of organic materials or uranium or iron, it is preferred to first oxidize the received material with hydrogen peroxide. Greater amounts of hydrogen peroxide may be used safely compared to NaClO$_2$ thereby reducing the overall amount of time for "cleaning up" the received material while maintaining maximum safety. It is much safer, and therefore preferred, to use NaClO$_2$ on a small scale because ClO$_2$ is an explosive gas. Using NaClO$_2$ on a small scale, e.g. mg Pu vs. 10 g U, provides a procedure without safety concerns.

In the second step of the process, the clean "cow" is processed to separate the alpha emitting radionuclides from the cow. For example, the "cow" thorium-229 radiochemically decays into the alpha emitting radiounuclide products radium-225 and actinium-225; and the "cow" thorium-227 decays into the alpha emitting radionuclide product radium-223. The separation for both $^{227}$Th and $^{225}$Ra/Ac from their respective "cows" $^{227}$Ac and $^{229}$Th; and $^{223}$Ra from $^{227}$Th is accomplished with a nitrate form anion exchange column. Accordingly, the hydrochloric acid carrier is removed and replaced with a nitric acid carrier in a manner similar to initial hydrochloric acid carrier placement.

According to the present invention, after obtaining the desired product, $^{223}$Ra or $^{225}$Ac, the separated daughter radionuclide, $^{227}$Th or $^{225}$Ra, respectively, is recycled to the clean "cow", $^{227}$Ac or $^{229}$Th, respectively, thereby greatly reducing the time between "milkings" for a predetermined amount of the desired product.

EXAMPLE 1

An experiment was conducted to demonstrate how to obtain purified $^{223}$Ra in accordance with the present invention depicted in FIG. 1. A sample 100 of a mixture containing approximately 4.37 mCi of $^{227}$Ac mixed with the daughter products $^{227}$Th and $^{223}$Ra together with impurities in 600 mL of 2M $HNO_3$ was received from the Fernald Environmental Restoration Corporation in Fernald, Ohio.

The nitric acid mixture was converted to a hydrochloric mixture by replacing the nitric acid with hydrochloric acid. The nitric acid was removed by evaporation 102 with a heat lamp to as close to dryness as possible without actually going completely dry. An amount of 6 mL of 12M HCl was then added to the dried mixture. The hydrochloric acid mixture was then evaporated to near dryness. The steps of re-mixing with hydrochloric acid and evaporating were repeated until brown fumes were no longer observed upon evaporation indicating that nitric acid was no longer present. An amount of 6 mL of 10M HCl 104 was added to the final dried mixture for transfer to a feed bottle.

Oxidation of the hydrochloric mixture was accomplished in the following manner. An amount of 0.060 mL of saturated $NaClO_2$ aqueous solution was added 106 to the transferred mixture, below the liquid level, with mixing. After 30 minutes, another amount of 0.060 mL of saturated $NaClO_2$ was added. In HCl solution, $NaClO_2$ was immediately converted to $ClO_2$ which is a gas of limited solubility. This yellow colored gas which is the oxidant for Pu has a limited lifetime in HCl solution. Thirty minutes were allowed for oxidation to occur and a second addition of $NaClO_2$ just before ion exchange of the treated solution insured that significant $ClO_2$ concentration was present during ion exchange processing. These steps insured maximum oxidation of Pu present in the mixture to the +6 oxidation state. A single addition of oxidant may, however, be adequate.

The oxidized mixture was fed into a 0.5 mL column of Dowex 1, "analytical grade" (AG), X-4 (200–400 mesh) chloride form anion exchange resin which had been pre-treated with 0.5 mL of 10M HCl 108. The feeding occurred within ten minutes of completing the oxidation step. Feeding within ten minutes of the last $NaClO_2$ addition insured that a significant $ClO_2$ concentration remained during feeding the anion exchange column.

An amount of 6 mL of effluent 110 was then collected in addition to three 0.5 mL fractions of 10M HCl used as a rinse. Pu, U, Fe, Co, Pb, Cu and other transition metal ion impurities were thus removed from the effluent onto the chloride form anion exchange column, leaving a product of $^{227}Ac$, $^{227}Th$ and $^{223}Ra$ daughters in hydrochloric acid.

A nitrate anion exchange process is used to separate the $^{227}Ac$ "primary cow" from the $^{227}Th$ "secondary cow". It is also used to separate the $^{227}Th$ "secondary cow" from the $^{223}Ra$ product. Accordingly, the hydrochloric acid carrier was removed and replaced with a nitric acid carrier. The effluent or product was heated and the hydrochloric acid evaporated to as near to dryness as possible without actually going dry 112. An amount of 1 mL of 16M $HNO_3$ was then added and these steps were repeated. The near-dryness product was then taken up in 0.5 mL of 8M $HNO_3$ 114.

A nitric form anion exchange column about 2.5 cm long with an inner diameter of about 2 mm was prepared by adding Dowex 1, AG, X-4 resin (200–400 mesh (0.08 mL) nitrate-form equilibrated in 0.5M $HNO_3$ to a glass tube. The resin was held at the bottom by a glass wool plug packed properly to prevent liquid drainage from a resin void space. All glassware was leached with ultra pure acids and quartz distilled water before these steps to prevent cross contamination. The column was conditioned by feeding 8M $HNO_3$ and rinsing the glass walls above the resin with each aliquot. The rinse acid was discarded.

The taken up to near-dryness product or "cow" (0.5 mL of $^{227}Ac$) was then slowly fed to the nitric form ion exchange column 116. The separated $^{227}Ac$ "Cow" effluent 118 was collected in a 20 mL vial. The column and glass walls were rinsed with four 0.5 mL aliquots of 8M $HNO_3$ and the rinse acid collected in the same vial. This 2.5 mL of $^{227}Ac$ or "cow" in nitric acid effluent was saved for recovery, storage and for future "milking" to obtain additional $^{227}Th/^{223}Ra$.

The thorium-227 "secondary cow" absorbed on the nitric form anion exchange column was eluted from the column with 0.5 mL of 0.35M $HNO_3$ 120, 122. The 0.35M nitric acid was evaporated 124 and replaced with 8M 126 nitric acid by heating as previously described. This 8M nitric acid $^{227}Th$ solution was held in storage for 10–20 days to allow partial decay 128 into $^{223}Ra$ which was separated on a nitric form anion exchange column 130 in the same manner as for previously described nitric form anion exchange column separations resulting in a highly purified $^{223}Ra$ product.

The solution containing the highly purified $^{223}Ra$ product 132 was evaporated to less than 2 mL or to a dry salt for shipment. The thorium is eluted in a first elution 134 and a second elution 136 and the second eluant 136 was recombined with the $^{227}Ac$ "cow" 118 to enhance the partial decay to additional $^{223}Ra$, or held as a separate solution for additional $^{223}Ra$

EXAMPLE 2

Figure 2:
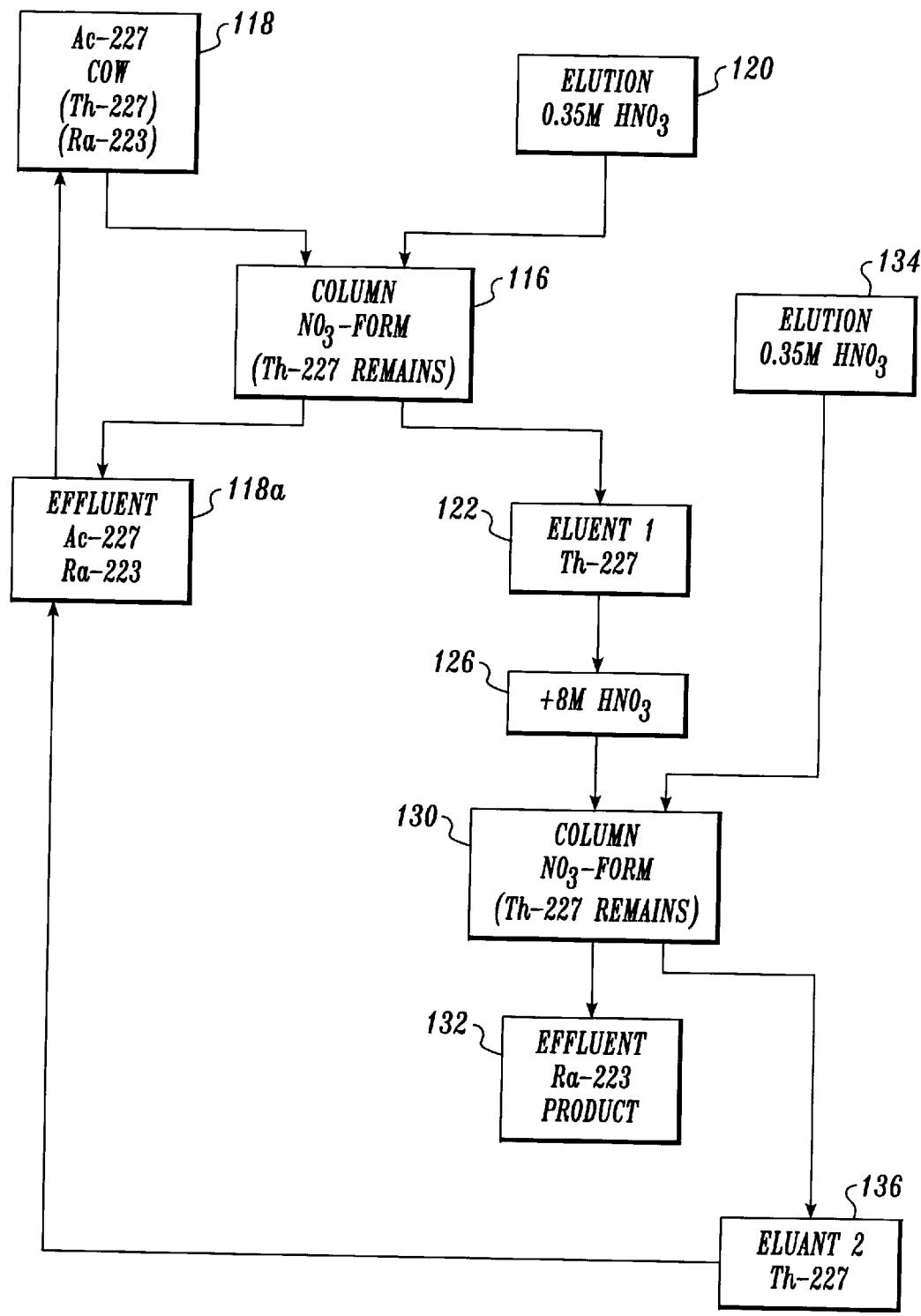
FIG. 2 is a process flow diagram for obtaining $^{223}$ from purified $^{227}$AC.

An experiment was conducted to demonstrate further production of radium-223 from the "cow" 118 purified from Example 1. Steps illustrated in FIG. 2 are a subset of the steps from FIG. 1. In this case, however, instead of starting with an impure mixture 100, we started with the purified primary "cow" of actinium-227 118 after in-growth to thorium-223 and radium-223. The purified "cow" 118 was passed through a nitric form anion exchange column 116 with the thorium-223 collected on the column 116 and the parent radionuclide, actinium-227 and any product radium-223 passed through as an effluent 118a and was saved for later reuse.

The "secondary cow" thorium-227 was permitted to decay into radium-223 122, 126 and then passed through another nitric form anion exchange column 130 that retained the thorium-227 and passed a highly purified radium-223 final product 132. The thorium-227 was eluted and recycled back to the primary Ac-227 "cow" for storage and reuse 134, 136.

Figure 3:
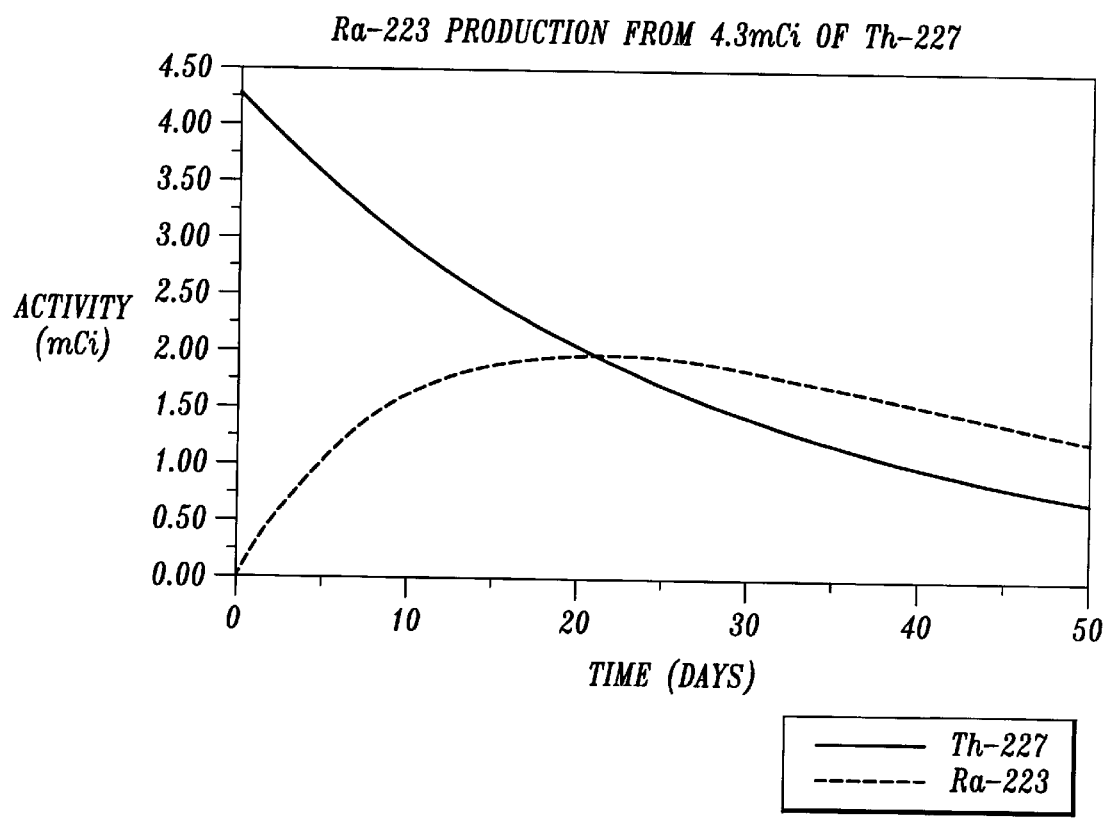
FIG. 3 is a graph of activity versus time for production of $^{223}$Ra from $^{227}$Th.
Figure 4:
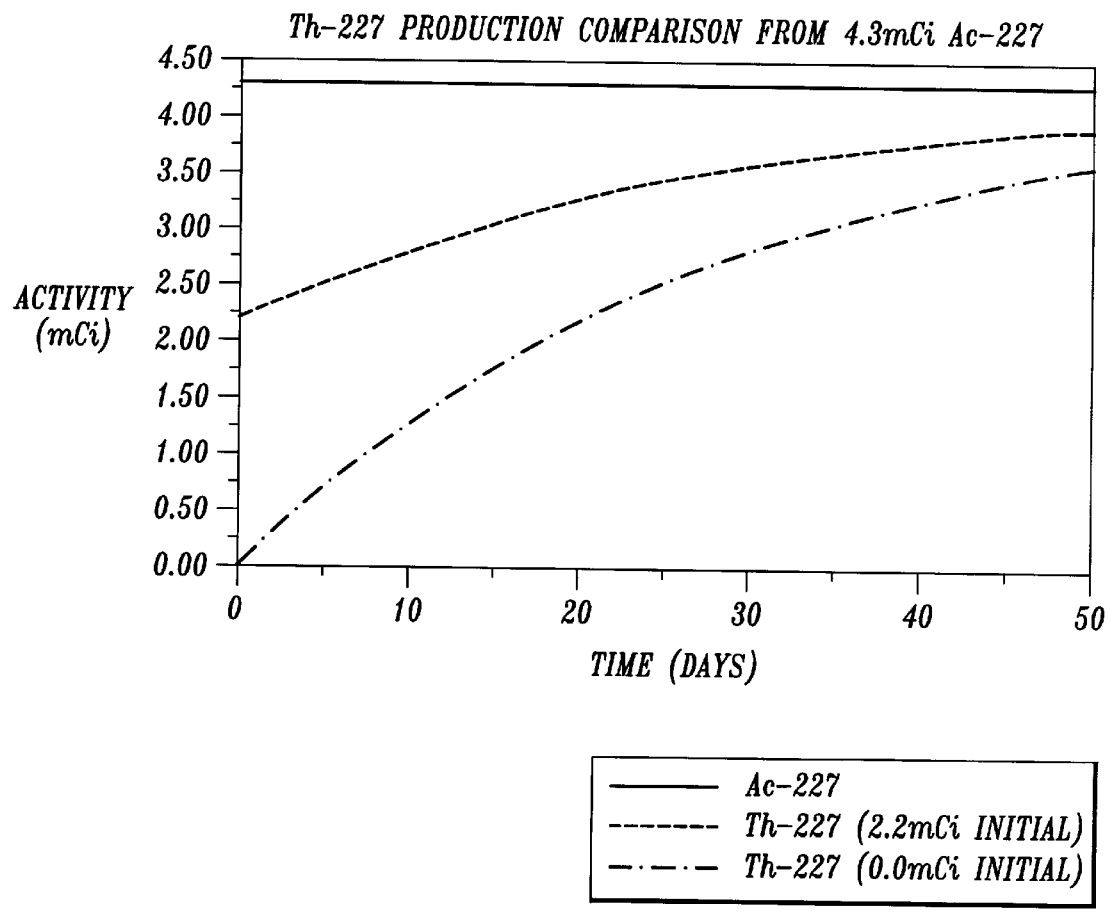
FIG. 4 is a graph of activity versus time comparing production of $^{227}$Th from $^{227}$Ac with and without an initial amount of $^{227}$Th.
Figure 5:
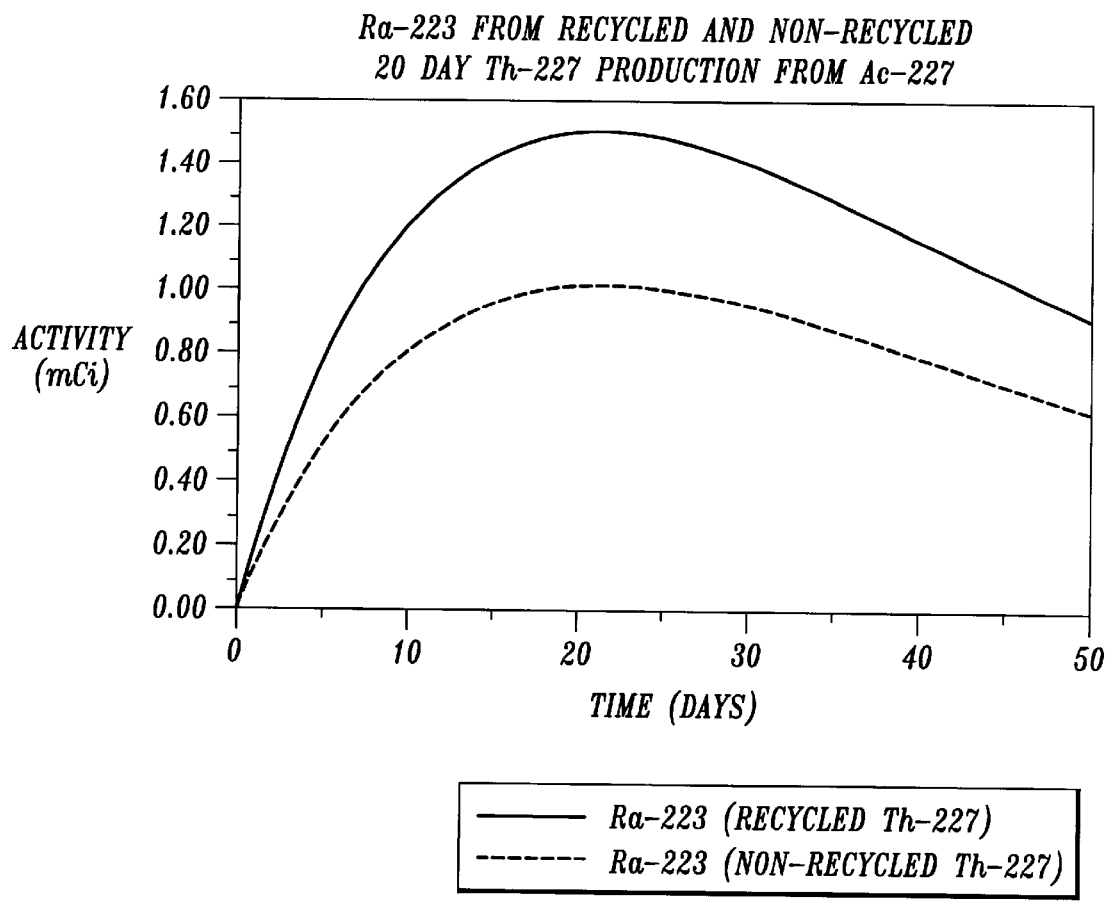
FIG. 5 is a graph of activity versus time comparing production of $^{223}$Ra from $^{227}$Ac with and without recycling of $^{227}$Th.

The production of radium-223 from a "pure" "secondary cow" of thorium-227 is shown in FIG. 3. Production of thorium-227 from actinium-227 was improved (increased yield of $^{223}Ra$) by retaining the thorium-227 as shown in FIG. 4 instead of discarding as waste. Radium-223 was enhanced by recycling the thorium-227 as shown in FIG. 5.

EXAMPLE 3

This experiment was conducted to demonstrate the separation and purification of $^{229}Th$ from aged (>20 yr) $^{233}U$ in which the $^{229}Th$ was produced by α-decay. The process is based on anion exchange in strong hydrochloric acid solution. Hexavalent and, to a somewhat lesser extent, tetravalent U are strongly absorbed by anion exchange resin from concentrated hydrochloric acid solution whereas $^{229}Th$ is not significantly absorbed.

Figure 6:
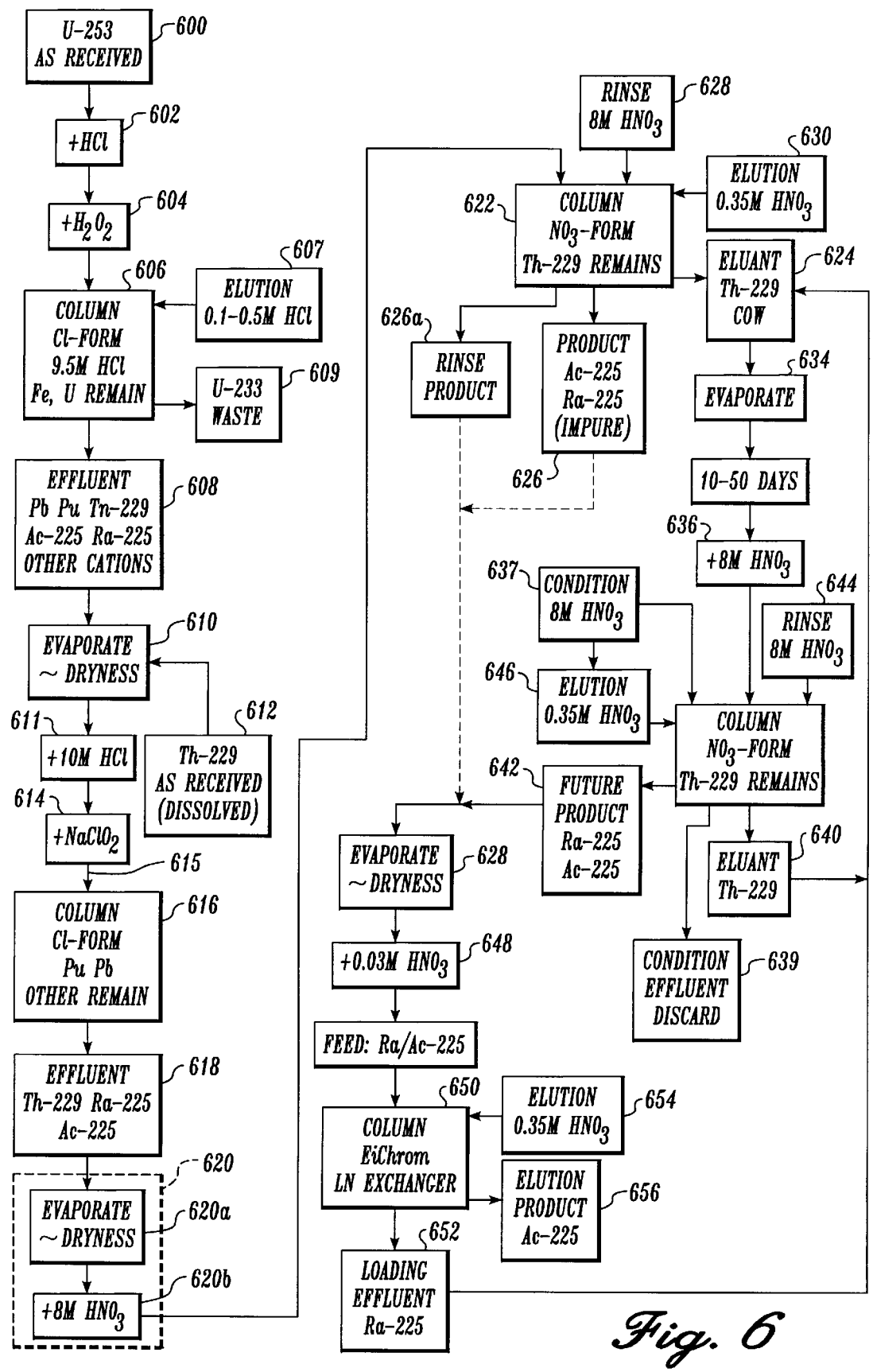
FIG. 6 is a process flow diagram for obtaining a purified $^{225}$Ac/$^{225}$Ra/$^{229}$Th "cow" and for obtaining an $^{225}$Ac product from the "cow".

Referring to FIG. 6, metallic (~10 g) $^{233}U$ containing impurities 600 was dissolved in hydrochloric acid solution 602. Hydrogen peroxide ($H_2O_2$) was added 604 to oxidize U(IV) to U(VI) and Fe(II) to Fe(III), and to help dissolve a large amount of extremely fine black uranium (oxyhydride?)

solids. The resulting solution was used as feed for the chloride anion exchange column 606 for initial removal of iron and uranium from the $^{229}$Th. Plutonium and/or lead are not oxidized by hydrogen peroxide and were not removed in this initial step.

After the $^{229}$Th was separated from the large amount of uranium, the chloride effluent 608 from the uranium step was then taken to dryness 610 and taken up in 1 mL of 10M HCl 611 forming an acid solution of $^{229}$Th with impurities including Pu and Pb 612. The Pu and Pb in the acid solution were oxidized using NaClO$_2$ 614. The oxidized acid solution of $^{229}$Th containing oxidized Pb, oxidized Pu and other impurities 615 was passed through a second small chloride form anion exchanger 616. The effluent 1 ($^{229}$Th free of Pu and Pb) 618 was then converted to a nitric acid solution 620 for anion exchange 622 to remove undesired common metal ions, e.g., Ca$^{2+}$, in order to produce a $^{229}$Th "cow" 624 of high purity.

Dissolution

A-1. The U metal (~10 g) 600 was added in increments as small as possible to HCl solution 602 (20 mL of 6M HCl if small pieces are available, 10 mL of 4M if only one piece) in a 200 mL Erlenmeyer flask with vigorous stirring at 0° C. in an ice bath with good heat transfer.

When the reaction has subsided, the solution can be warmed to speed the reaction and, after again cooling the solution, 12M HCl can be added carefully in small increments (<2 mL). If the reaction is still too slow, the solution can be warmed and 12M HCl can be added in very small increments (dropwise) to the warm solution.

A-2. Repeat Step A-2 as necessary until all U metal is dissolved.

Feed Adjustment

B-1. Oxidize the deep green U(IV) solution, which may contain a large amount of extremely fine black uranium (oxyhydride?) solids, by slowly adding 30% H$_2$O$_2$ solution (2 mL, 1.45 g/mL, 0.87 g of H$_2$O$_2$) 604. (The reaction may be quite vigorous, so add slowly with mixing). These uranium solids are insoluble in HCl but have not been positively identified as to structure. If the starting feed was UO$_2$ or U$_3$O$_8$ instead of U metal, the use of H$_2$O$_2$ for the dissolution in HCl would also apply.

B-2. Continue adding 30% H$_2$O$_2$ solution 602 (2 mL aliquots) until the green color of U(IV) and black solid disappear and the yellow color of U(VI) appears. The mixture still contains cationic impurities.

B-3. Heat the mixture to 50°–60° C. for 10 min to decompose the excess of H$_2$O$_2$, trapping the HCl vapors by use of vacuum to pull the HCl gas through an empty gas-washing bottle with a short delivery tube to prevent back-flushing and then one containing sufficient NaOH solution to neutralize the calculated amount of HCl.

B-4. Heat the mixture to boiling and evaporate with stirring to less than 20 mL, trapping the HCl vapors.

B-5. Cool the solution to room temperature.

B-6. Dilute the solution with 9.5M HCl (230 mL). The resulting solution is the feed for the anion exchange column.

Hydrochloric Acid Anion Exchange—Uranium and Iron Removal

C-1. Prepare a chloride form anion exchange column 606 ~45 cm long with an inner diameter of ~2.4 cm and a bottom stopcock by adding ~200 ml of Dowex 1×4 (50–100 mesh, equilibrated in 0.5M HCl) to a glass tube of the appropriate dimensions. The column will have a coarse glass frit near the bottom to retain the resin and a stopcock at the bottom.

C-2. Insert a ⅛ in Saran line through a rubber stopper so that the seal is air-tight. This rubber stopper with the Saran line through it will be attached to the top of the anion exchange column so that the seal is air-tight and will be used as a syphon to add solutions to the column.

C-3. Condition the column by rapidly feeding 9M HCl 607 (~50 mL) into it. Discard the effluent 609.

C-4. Feed the U solution (~40 g/L of U) into the column slowly at first so that ~3 h would be required to add all of it. The flow rate can be adjusted using the bottom stopcock.

C-5. Collect the first 60 mL of effluent 608 in an Erlenmeyer flask (void-volume fraction).

C-6. Collect the next ~280 mL of effluent 608 (main $^{229}$Th fraction, feed and wash from the next step) in a separate Erlenmeyer flask.

C-7. After all feed is added, wash the column with 9M HCl (400 mL). The first 100 mL should be fed no more rapidly than the feed.

C-8. The final ~310 ml of effluent (mostly wash) should be collected in a third Erlenmeyer flask.

Purification of $^{229}$Th from Plutonium and/or Lead

D-1. Boil the $^{229}$Th main-product fraction (second Erlenmeyer flask) until the desired volume remains (<1 mL near dryness, <0.1 mL) 610. Trap the evaporated HCl.

D-2. Take up in 1 mL of 10M HCl 611. Add 0.010 mL (10λ) of saturated NaClO$_2$ solution in water 614, below the surface and with mixing. Wait 30 minutes and add another 0.01 mL NaClO$_2$ 614 in the same manner.

D-3. Within 10 minutes of step D-2, feed the Th solution to an 0.5 mL column 616 of Dowex 1, AG, X-4 (200–400 mesh) anion exchange resin in the chloride form, pretreated with 0.5 mL of 10M HCl.

D-4. Collect the 1 mL of effluent containing the $^{229}$Th product followed by three 0.5 mL fractions of 10M HCl, rinsing the Th container and the upper column walls in the process. This is the Th product. Check γ-activity of the column and the product bottle.

D-5. Convert the $^{229}$Th solution to a nitric acid solution 620 by evaporating to near dryness 620a in a 20 mL vial (trapping the HCl vapors).

D-6. Evaporate the Th chloride product to a small volume, add 1 mL of 15.8M HNO$_3$ 620b, evaporate to near dryness.

D-7. Repeat D-5 twice again, finally taking up in 5 mL 8M HNO$_3$. This solution is the feed for a nitric acid anion exchange column 622 to remove common metal ions, e.g., Ca$^{2+}$. See Nitric Acid Anion Exchange (Sect. E).

Nitric Acid Anion Exchange—Separation of $^{225}$Ra/Ac Daughter and Other Impurities from $^{229}$Th "cow"

E-1. Prepare a nitric acid anion exchange column 622 ~5 cm long with an inner diameter of ~4 mm by adding Dowex 1, AG, X-4 resin (100–200 or 200–400 mesh, nitrate-form equilibrated in 0.5M HNO$_3$) to a glass tube of appropriate dimensions. The resin will be held at the bottom by a glass wool plug packed properly to prevent liquid drainage from resin void space.

E-2. Condition the column by feeding 8M HNO$_3$ (~2 mL) into it. Discard the effluent.

E-3. Add the $^{229}$Th feed slowly to the column.

E-4. Collect the effluent 626 in a 20 mL vial. The first time the $^{225}$Ra/Ac effluent is collected (starting with U-metal or "as received" $^{229}$Th feed) it may contain other cations that were not captured by chloride anion exchange and should be discarded.

E-5. Rinse 628 the column with five 1 mL aliquots of 8M HNO$_3$, rinsing the glass walls above the resin with each aliquot.

E-6. Collect the effluent 626a in the same 20 mL vial. This represents the $^{225}$Ra/Ac product.

E-7. The $^{225}$Ra/Ac product 626a was then evaporated to near dryness 628 and held for radium/actinium separation (Section H).

E-8. Elute the $^{229}$Th with 0.35M HNO$_3$ (6 mL) 630.

E-9. Collect the first 6 mL of effluent in a 20 mL vial 624.

E-10. Check the vial from a second 6 mL of effluent to be sure that it contains no $^{229}$Th. Discard the solution if it contains no $^{229}$Th.

E-11. Evaporate 634 the $^{229}$Th "cow" to dryness and store for future separation of $^{225}$Ra/Ac. Determine the total thorium using ICP analysis.

Uranium Recovery

F-1. Elute the $^{233}$U from the 200 mL chloride form anion exchange column 606 using 0.1–0.5M HCl 607 at a flow rate such that the elution front appears sharp.

F-2. As soon as a yellow color appears at the column bottom, begin $^{233}$U collection and continue collecting until the effluent is colorless.

F-3. Evaporate the $^{233}$U solution 609 to >10 mL, trapping the HCl vapors.

F-4. Transfer the $^{233}$U solution to a 20 mL vial 609 and evaporate to dryness, trapping the HCl vapors. $^{229}$Th Milking and $^{225}$Ra/Ac Separation G-1. Take the purified $^{229}$Th "cow" (E-11) and redissolve in 5 mL 8M HNO$_3$ 636. This solution is the feed for a nitric acid anion exchange column 638 to "milk" the $^{225}$Ra/Ac in the effluent and absorb the $^{229}$Th on the anion exchanger.

(Repeat Same steps as in E-1 through E-11).

G-2. Prepare a nitric acid anion exchange column 638 ~5 cm long with an inner diameter of ~4 mm by adding Dowex 1, AG, X-4 resin (100–200 or 200–400 mesh, nitrate-form equilibrated in 0.5M HNO$_3$) to a glass tube of appropriate dimensions. The resin will be held at the bottom by a glass wool plug packed properly to prevent liquid drainage from resin void space.

G-3. Condition the column by feeding 8M HNO$_3$ (~2 mL) 637 into it. Discard the effluent 639.

G-4. Add the $^{229}$Th feed 636 slowly to the column 638.

G-5. Collect the effluent 642 in a 20 mL vial.

G-6. Rinse 644 the column with five 1 mL aliquots of 8M HNO$_3$, rinsing the glass walls above the resin with each aliquot.

G-7. Collect the rinse effluent 642 in the same 20 mL vial. This represents the purified $^{225}$Ra/Ac product 642.

G-8. The $^{225}$Ra/Ac product 642 was then evaporated to near dryness 628 and held for radium/actinium separation (Section H).

G-9. Elute the $^{229}$Th with 0.35M HNO$_3$ (6 mL) 646.

G-10. Collect the first 6 mL of eluent 640 in a 20 mL vial.

G-11. Check the vial from a second 6 mL of effluent to be sure that it contains no $^{229}$Th. Discard the solution if it contains no $^{229}$Th.

G-12. Evaporate 634 the $^{229}$Th "cow" to dryness and store for future separation of $^{225}$Ra/Ac.

Separation of $^{255}$Ra from $^{225}$Ac (The volumes and column size described in this example will vary depending on the amount of product to be separated)

H-1. Take the dried and "purified" product $^{225}$Ra/Ac 628, Step G-8. Dissolve in 0.3 mL of 0.03M HNO$_3$ 648.

H-2. Prepare an ion exchange column 650 (~3.5 cm in length) using 100 mg of silica based Ln® resin (Eichrom Industries, Inc., Darien, Ill.). The procedure is based on a known method developed by Oak Ridge National Laboratory and the National Institute of Health. The amount of resin use will vary with the amount of Ra/Ac being separated.

H-3. Precondition the exchanger with 0.03M HNO$_3$.

H-4. Add the 0.3 mL of feed 648 to the top of the column and start to accumulate the $^{225}$Ra in the effluent 652.

H-5. Add ~0.4 mL of 0.03M HNO$_3$ wash and combine with the above $^{225}$Ra product.

H-6. Capture the above effluent 652 in 0.10 mL fractions and verify by radionuclide gamma counting that the $^{225}$Ra has been removed from the column.

H-7. Combine those fractions containing the peak activity of $^{225}$Ra and recycle it back to the $^{229}$Th "cow" 624 (G-12) to enhance future production of $^{225}$Ra/Ac.

H-8. Elute 654 the $^{225}$Ac purified product using approximately 0.70 mL of 0.35M HNO$_3$, capturing each 0.10 mL fraction and verify by radionuclide gamma counting that the $^{225}$Ac has been removed from the column.

H-9. Combine those fractions containing the peak activity of $^{225}$Ac 656 and take to near dryness for storage, shipment or use in the production of $^{213}$Bi.

EXAMPLE 4

Figure 7:
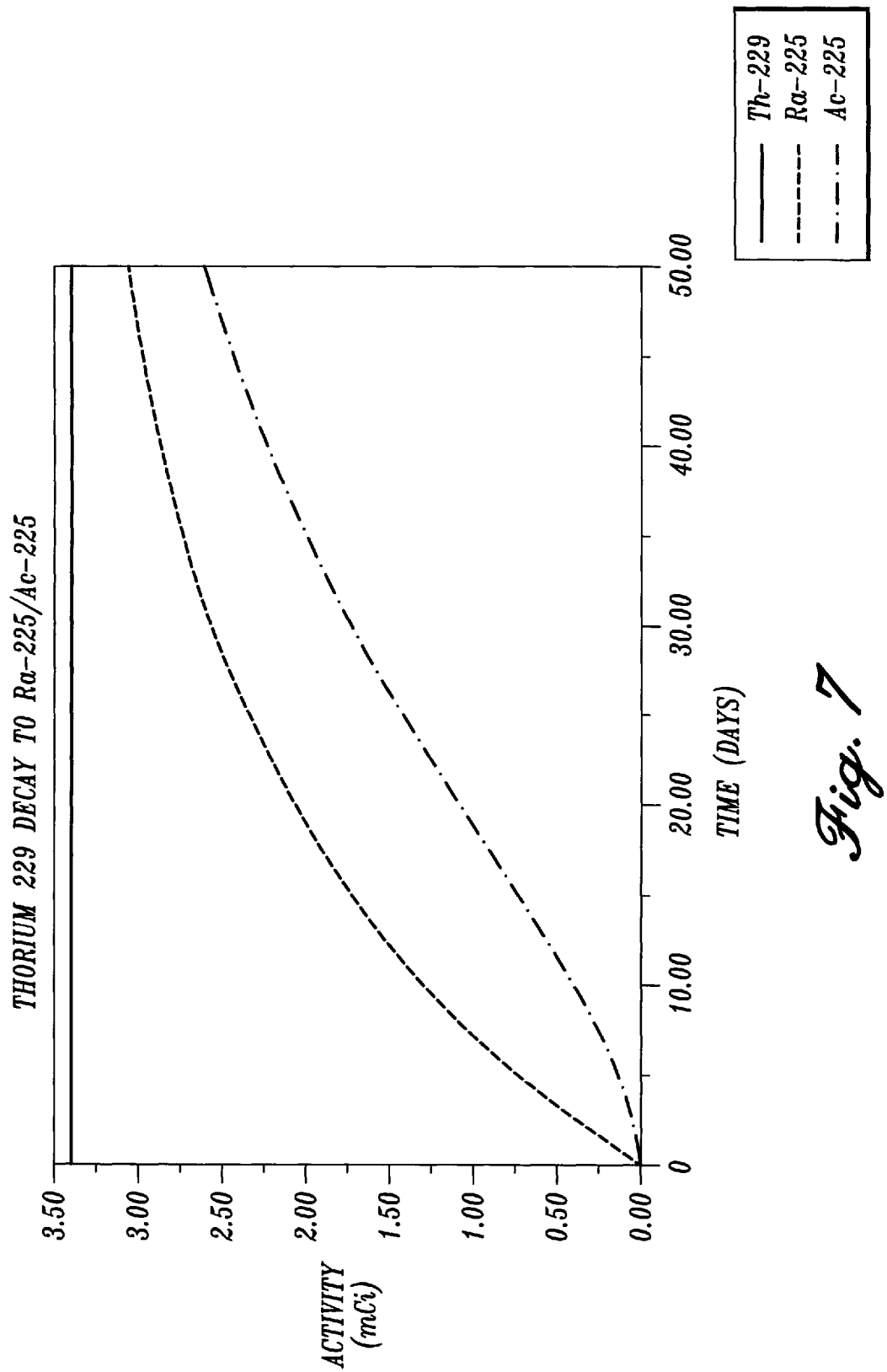
FIG. 7 is a graph of activity versus time for decay of $^{229}$Th to $^{225}$Ra/Ac.
Figure 8:
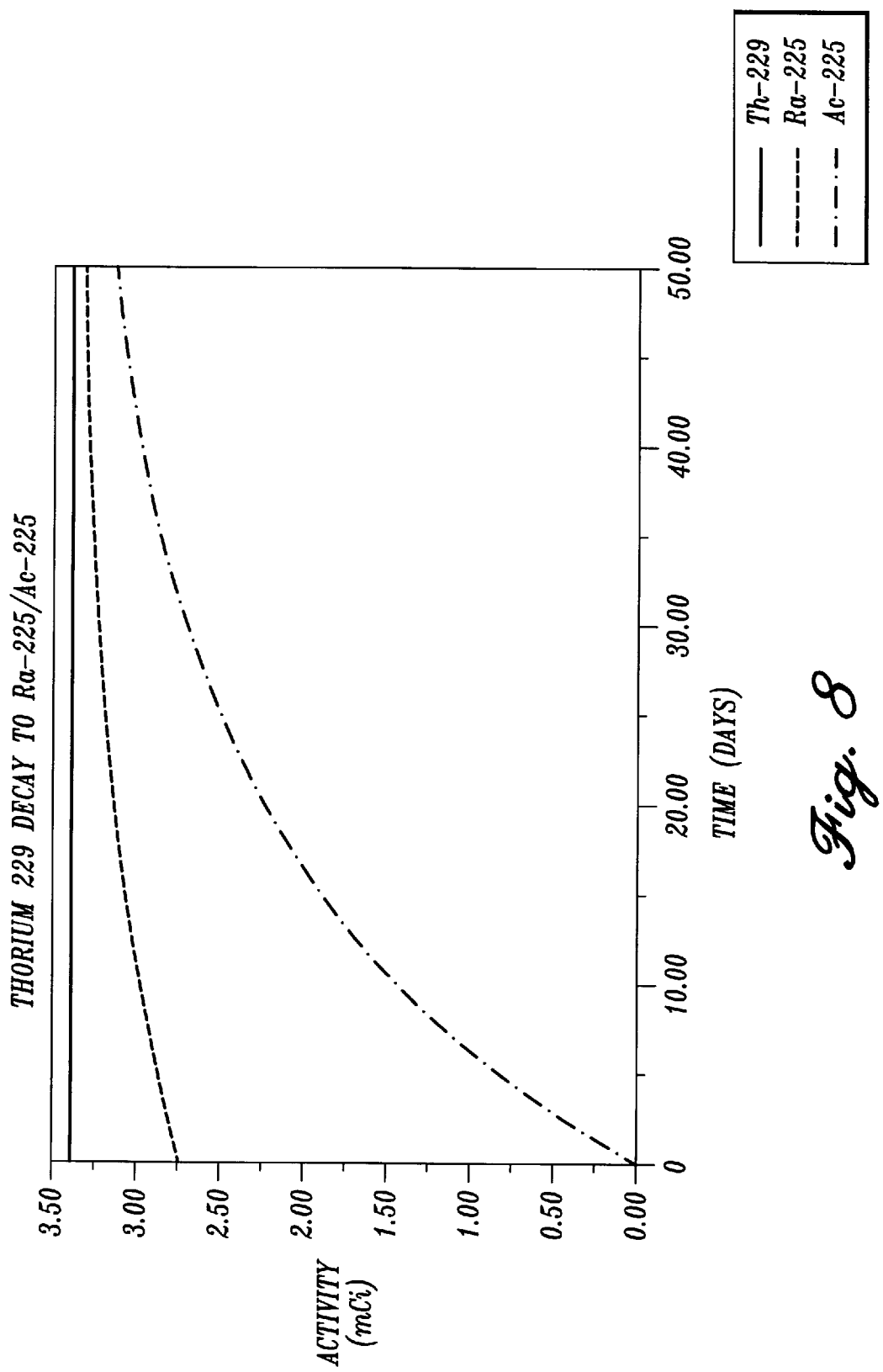
FIG. 8. is a graph of activity versus time for decay of $^{229}$Th to $^{225}$Ra/Ac wherein the $^{225}$Ra is recycled back to the $^{229}$Th.

The production of radium-225 and actinium-225 from the decay of a "pure" "secondary cow" of thorium-229 is shown in FIG. 7. Production of radium-225 and actinium-225 from thorium-229 decay was improved (increased yield of $^{225}$Ra/Ac) by retaining the radium-225 and recycling it back to the thorium-229, as shown in FIG. 8 instead of discarding as waste.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of removing an impurity from a mixture of radionuclides that contains a parent radionuclide, the impurities and a carrier, the method comprising the steps of:

(a) insuring that the carrier is a hydrochloric acid carrier;

(b) adding at least one oxidant to the mixture and specifically oxidizing the impurity to its highest oxidation state; and (c) passing the oxidized mixture through a chloride form anion exchange column whereupon the oxidized impurity absorbs to the chloride form anion exchange column and the parent radionuclide passes through the chloride form anion exchange column.

2. The method as recited in claim 1, wherein insuring comprises the steps of:

(a) drying the mixture to remove a non-hydrochloric acid carrier; and (b) adding hydrochloric acid as a carrier.

3. The method as recited in claim 1, wherein oxidizing is achieved with a chemical oxidant.

4. The method as recited in claim 3, wherein said chemical oxidant is sodium chlorite.

5. The method as recited in claim 1, further comprising the steps of:

(a) replacing the hydrochloric acid carrier with a nitric acid carrier; and (b) passing the parent radionuclide through a nitrate form anion exchange column and separating the parent radionuclide from a daughter radionuclide.

6. The method as recited in claim 5, wherein said parent radionuclide is selected from the group consisting of thorium-229, and actinium-227/thorium-227.

7. The method as recited in claim 1, wherein the at least one oxidant is a first oxidant and a second oxidant.

8. The method as recited in claim 7, wherein the first oxidant is hydrogen peroxide.

9. The method as recited in claim 7, wherein the second oxidant is sodium chlorite.

10. The method as recited in claim 8, wherein said impurities are selected from the group consisting of uranium, iron and combinations thereof.

11. A method of obtaining an alpha emitting radionuclide sufficiently pure for medical therapy, wherein a parent radionuclide is present in a mixture containing an impurities including plutonium, lead or combinations thereof, the method comprising the steps of:
 (a) insuring that the mixture is a hydrochloric acid mixture;
 (b) oxidizing the hydrochloric acid mixture and specifically oxidizing the plutonium, lead or combination thereof to its highest oxidation state; and
 (c) passing the oxidized mixture through a chloride form anion exchange column whereupon the oxidized plutonium, lead or combination thereof absorbs to the chloride form anion exchange column and a "cow" $^{227}$Ac or $^{229}$Th radionuclide passes through the chloride form anion exchange column.

12. The method as recited in claim 11, wherein insuring comprises the steps of:
 (a) drying the mixture to remove a non-hydrochloric acid carrier; and
 (b) adding hydrochloric acid as a carrier.

13. The method as recited in claim 11, wherein oxidizing is achieved with a chemical oxidant.

14. The method as recited in claim 13, wherein said chemical oxidant is sodium chlorite.

15. The method as recited in claim 11, further comprising the step of passing the parent radionuclide through a nitrate form anion exchange column for separating the product from the "cow".

16. The method as recited in claim 15, wherein said "cow" is selected from the group consisting of thorium-229, and actinium-227.

17. The method as recited in claim 11, further comprising preoxidizing the hydrochloric acid mixture.

18. The method as recited in claim 17, wherein the preoxidizing is with hydrogen peroxide.

* * * * *

UNITED STATES PATENT AND TRADEMARK OFFICE
CERTIFICATE OF CORRECTION

PATENT NO. : 5,885,465
DATED : March 23, 1999
INVENTOR(S) : Bray et al.

Page 1 of 1

It is certified that error appears in the above-identified patent and that said Letters Patent is hereby corrected as shown below:

Title page,
Item [57], abstract line 10, please replace "the $22^9$Th or $2^{27}$ Ac" with --the $^{229}$Th or $^{227}$Ac--.

Column 1,
Line 44, please add "→" before --$^{229}$Th (7,340 yr t½)--.

Column 9,
Line 23, please start the sentence "$^{229}$Th Milking and..." on a new line.

Column 11,
Line 15, please delete the word "an" before the word --impurities--.

Signed and Sealed this

Nineteenth Day of June, 2001

Attest:

NICHOLAS P. GODICI
Attesting Officer
Acting Director of the United States Patent and Trademark Office